United States Patent
Raman et al.

(10) Patent No.: US 6,993,527 B1
(45) Date of Patent: Jan. 31, 2006

(54) DESCRIBING DOCUMENTS AND EXPRESSING DOCUMENT STRUCTURE

(75) Inventors: T. V. Raman, Mountain View, CA (US); Perry A. Caro, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/582,355

(22) PCT Filed: Dec. 21, 1998

(86) PCT No.: PCT/US98/27322

§ 371 (c)(1),
(2), (4) Date: Jun. 21, 2000

(87) PCT Pub. No.: WO99/32982

PCT Pub. Date: Jul. 1, 1999

(51) Int. Cl.
G06F 17/00 (2006.01)
G06F 17/30 (2006.01)

(52) U.S. Cl. .......................... 707/100; 707/1; 715/500; 715/516

(58) Field of Classification Search ................ 707/1–3, 707/4, 7, 10, 100–103, 103 C, 200, 205; 715/500–516; 709/200–201
See application file for complete search history.

(56) References Cited

U.S. PATENT DOCUMENTS

| 5,495,567 | A | * | 2/1996 | Iizawa et al. ............... 345/762 |
| 5,604,843 | A | * | 2/1997 | Shaw et al. .................. 358/1.1 |
| 5,794,234 | A | * | 8/1998 | Church et al. ................ 707/4 |
| 6,249,794 | B1 | * | 6/2001 | Raman ....................... 715/500 |
| 6,499,026 | B1 | * | 12/2002 | Rivette et al. ................ 707/2 |

FOREIGN PATENT DOCUMENTS

EP          325316          7/1989

* cited by examiner

*Primary Examiner*—Alford W. Kindred
(74) *Attorney, Agent, or Firm*—Fish & Richardson P.C.

(57) ABSTRACT

Apparatus and methods of revealing the hierarchical structure of a document having content of a characteristic type of content are described (100). The hierarchical structure may be expressed, independently of document content type, as a tree structure of one or more nodes (126) A semantic representation for interpreting the tree structure may also be provided, document description files are used to encapsulate structural and meta information associated with a document stored on a computer-readable medium (156). Document description files are external to native application files and have a set of required fields. Document description files point to the referenced document data using uniform resource locators (URLS) and serve as virtual documents. In addition to the required fields, applications can choose to encode additional structural information in the document description files.

62 Claims, 7 Drawing Sheets

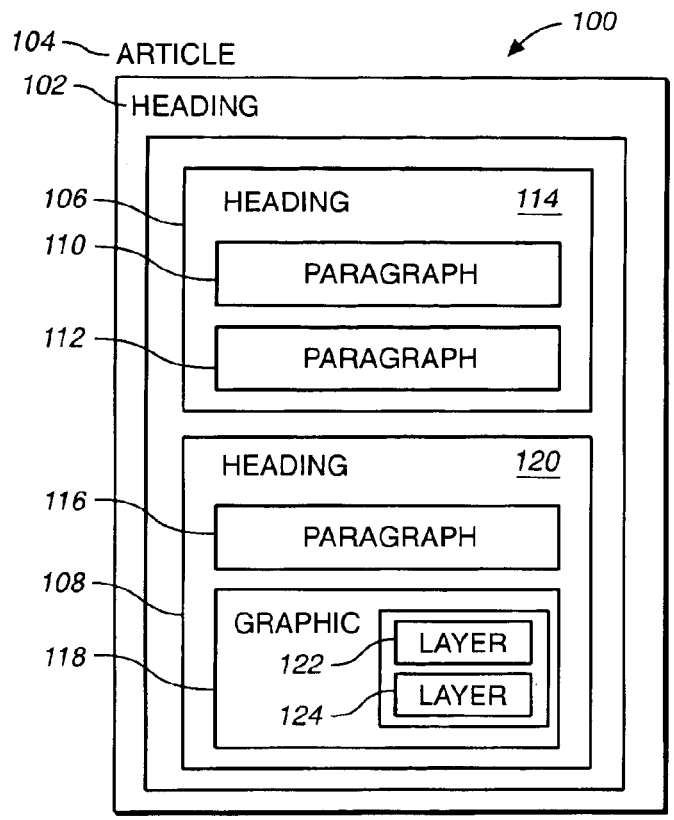
*FIG._1A*
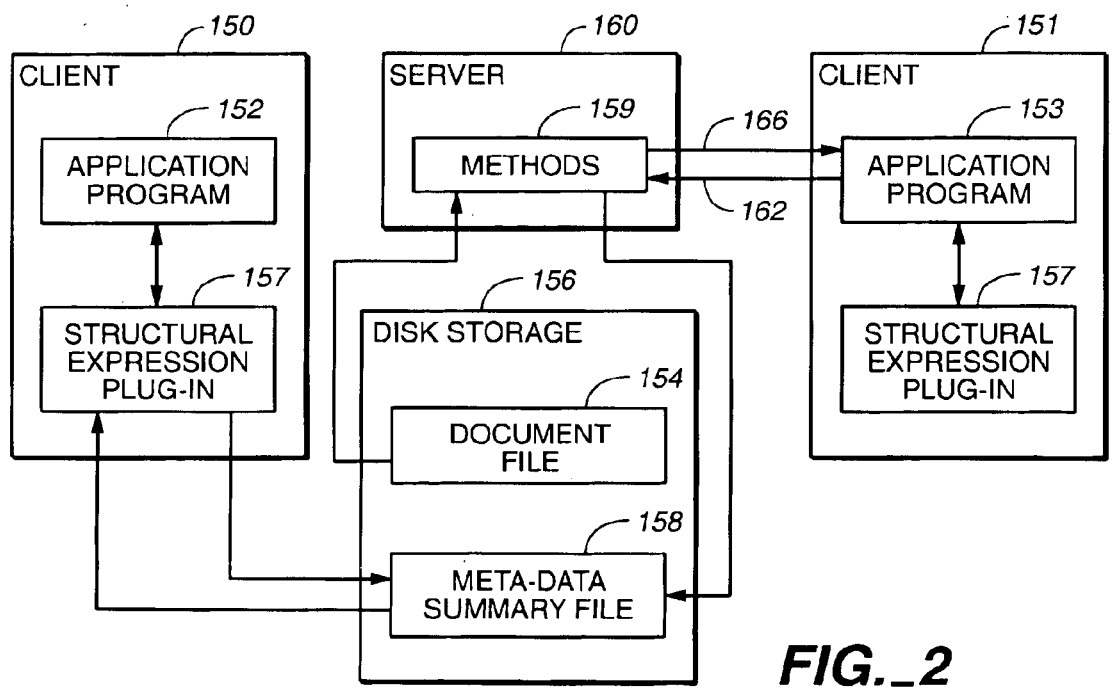
*FIG._2*

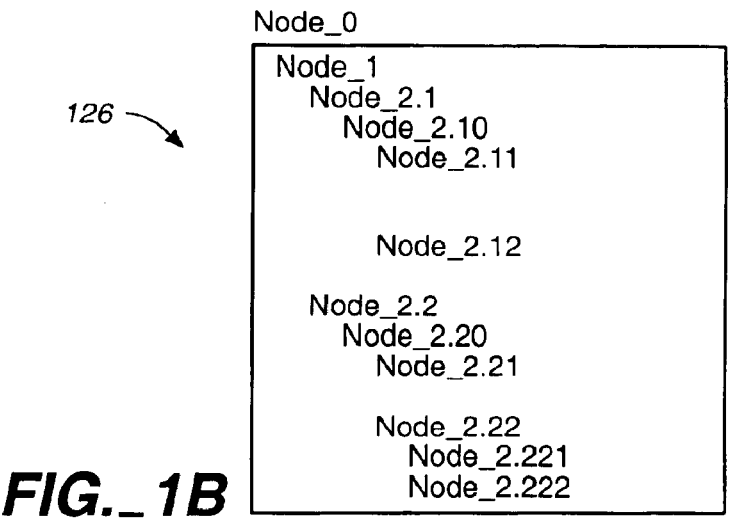
FIG._1B
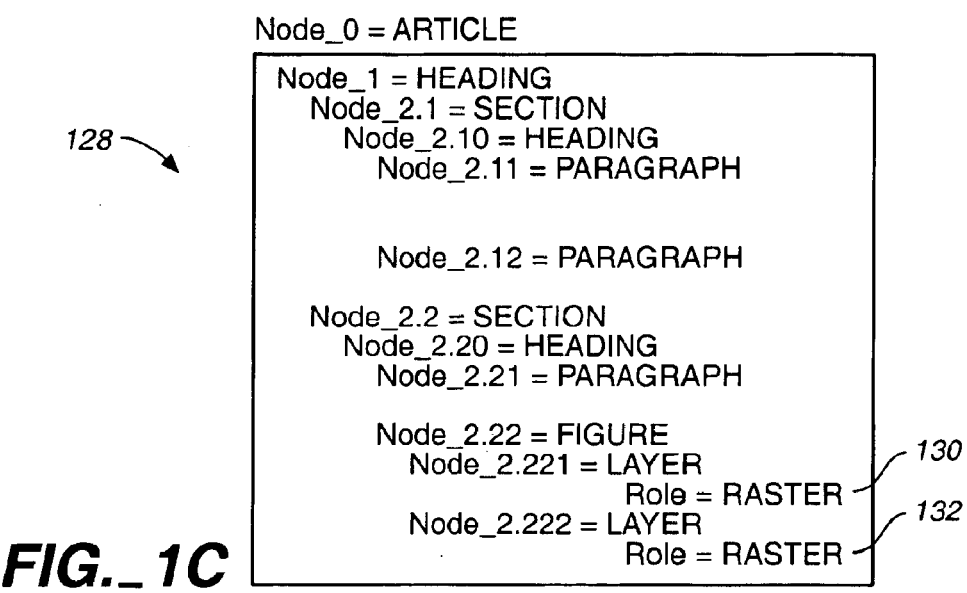
FIG._1C
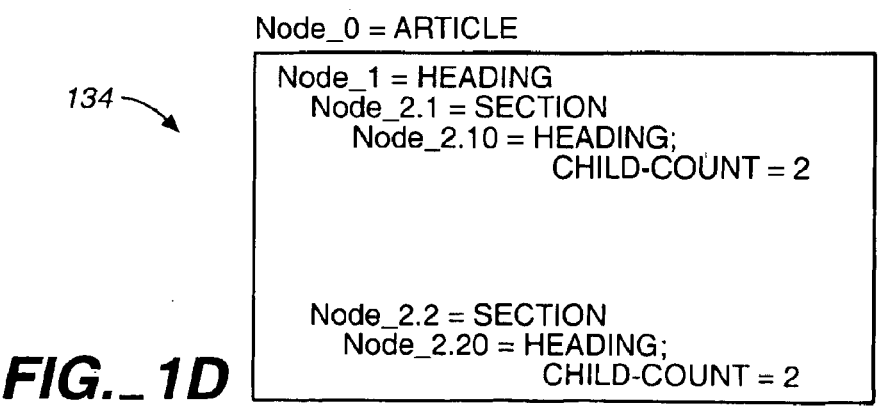
FIG._1D

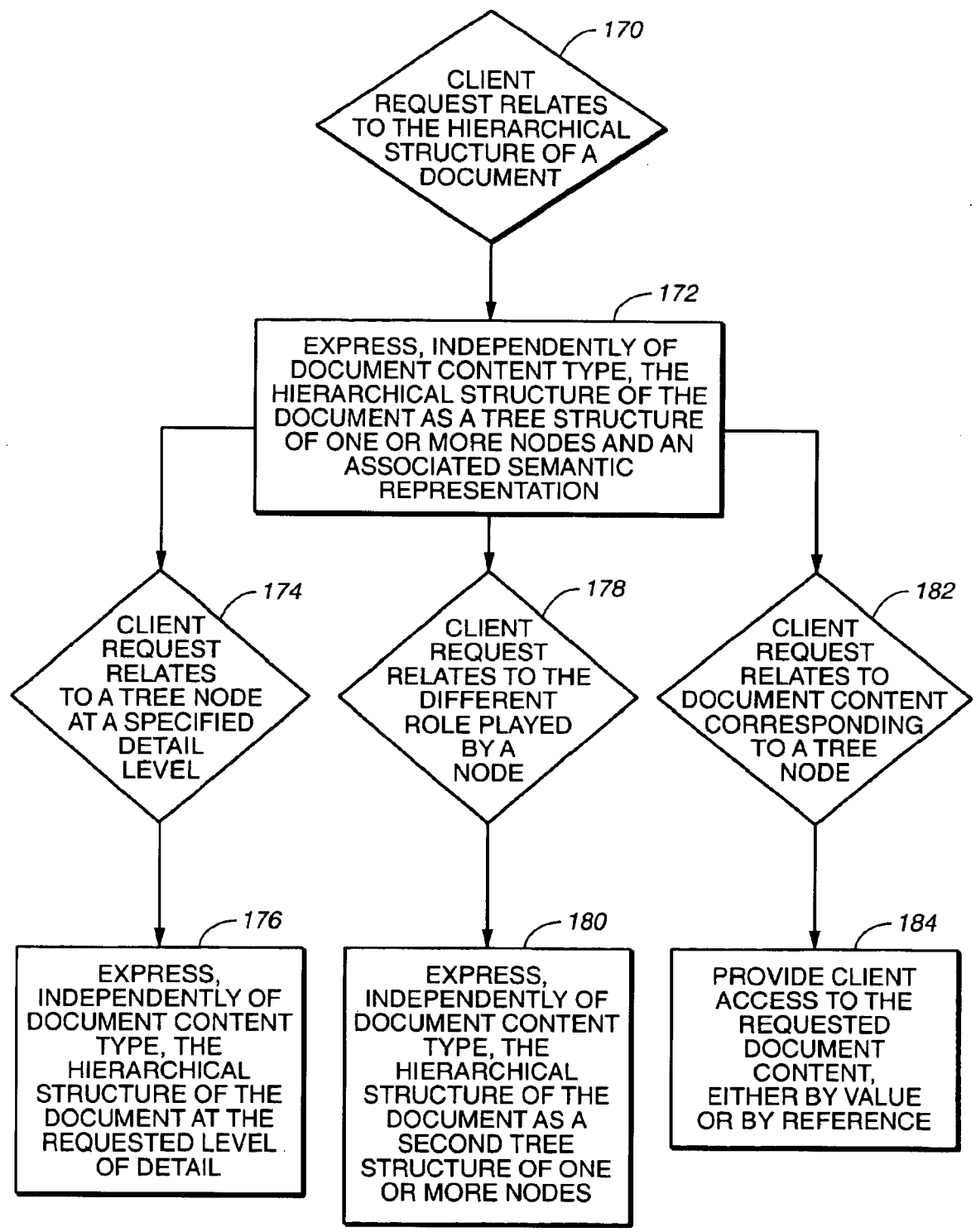
FIG._3

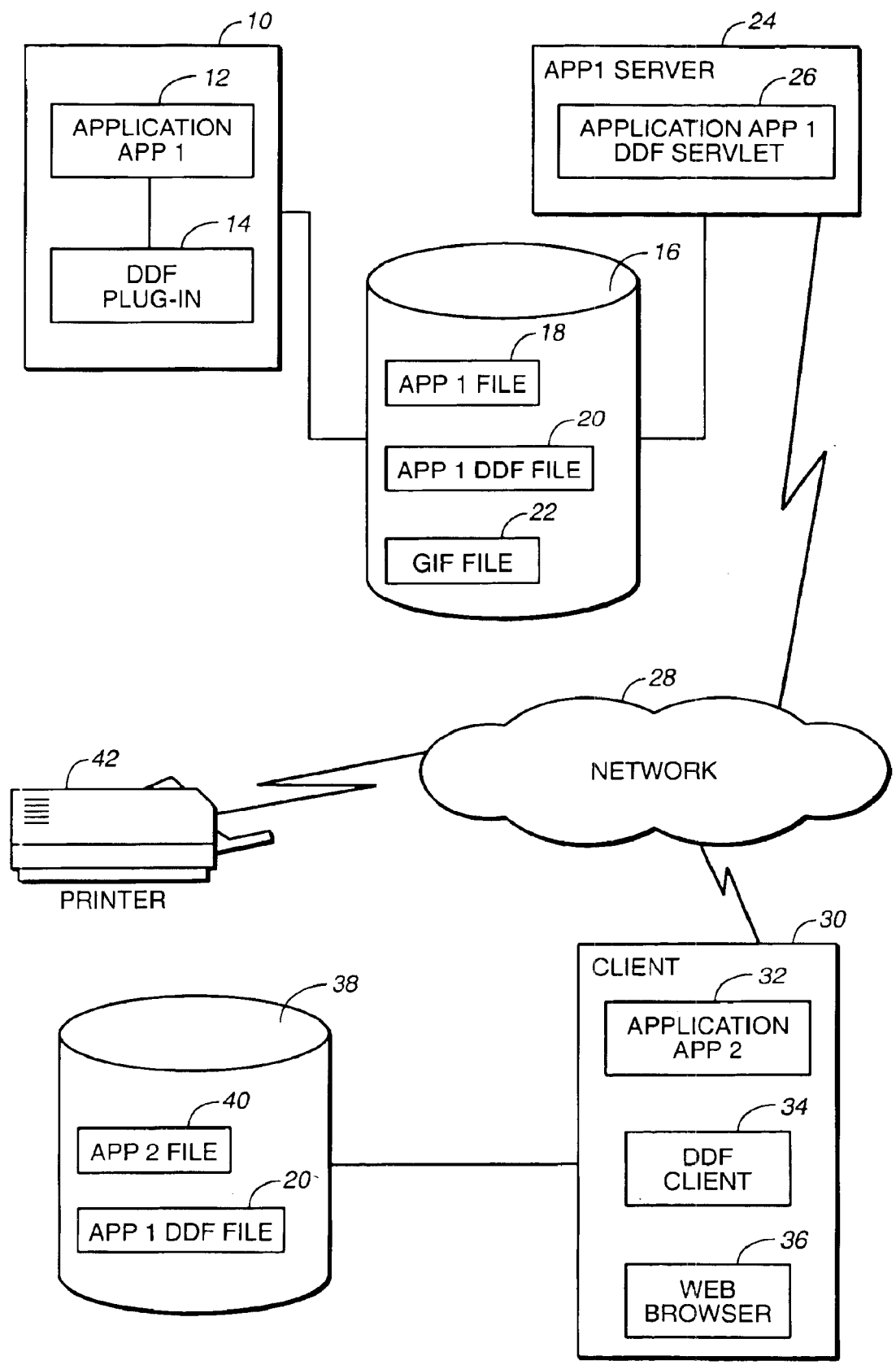
FIG._4

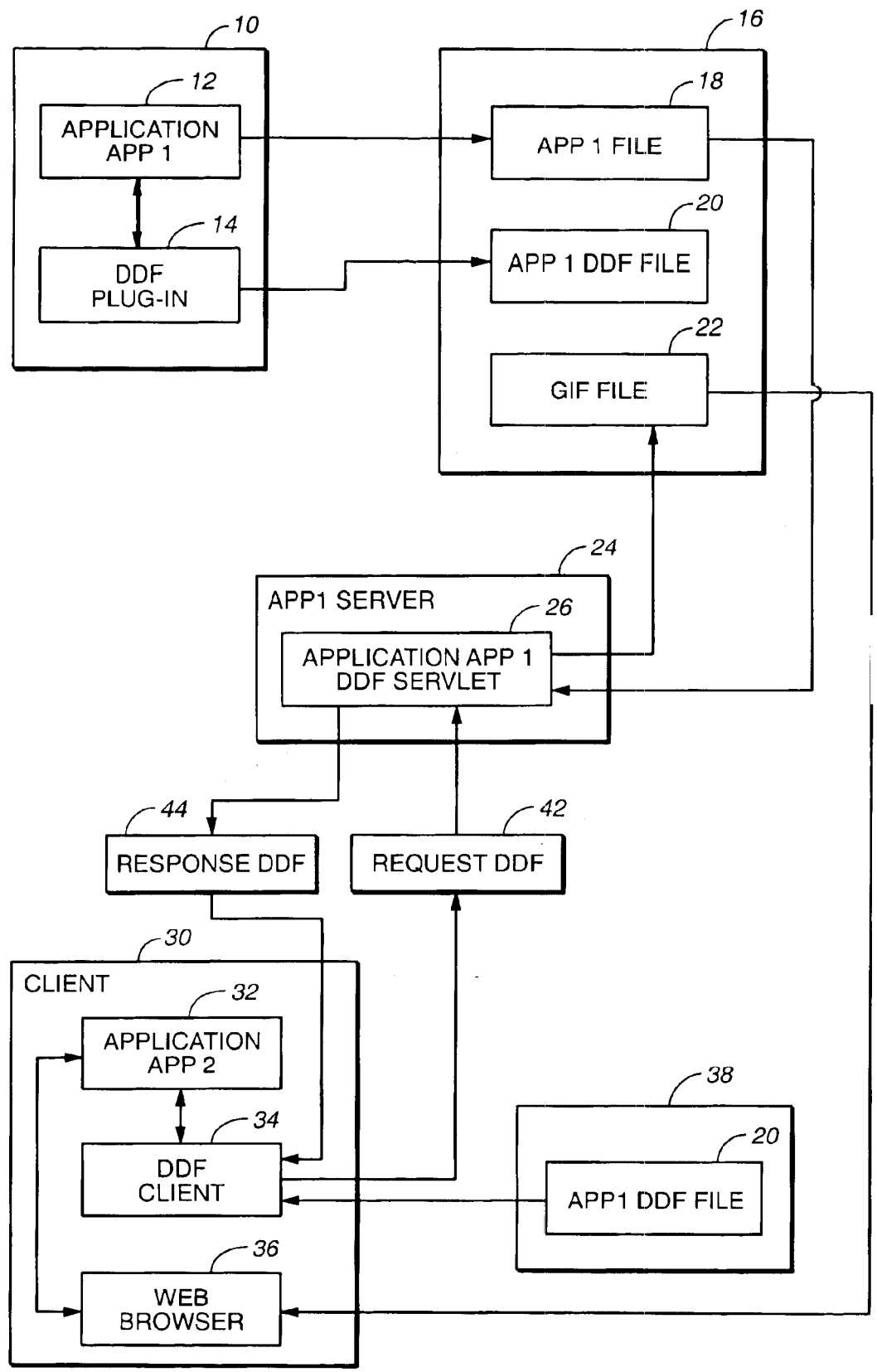
FIG._5

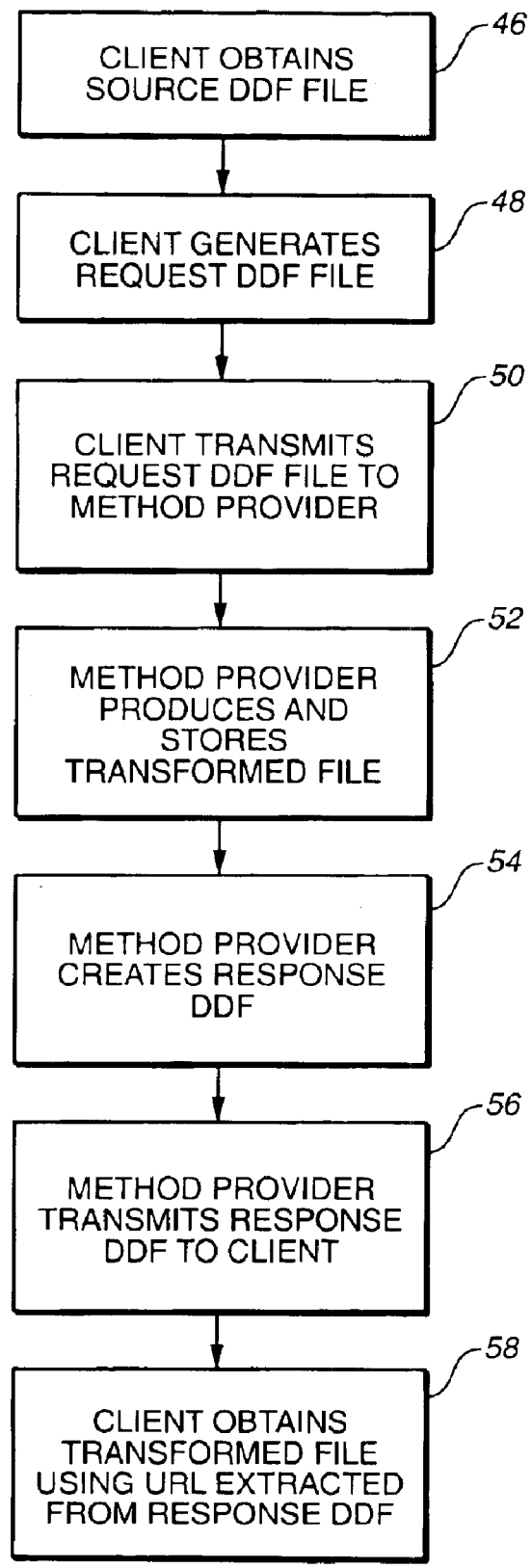
FIG._6

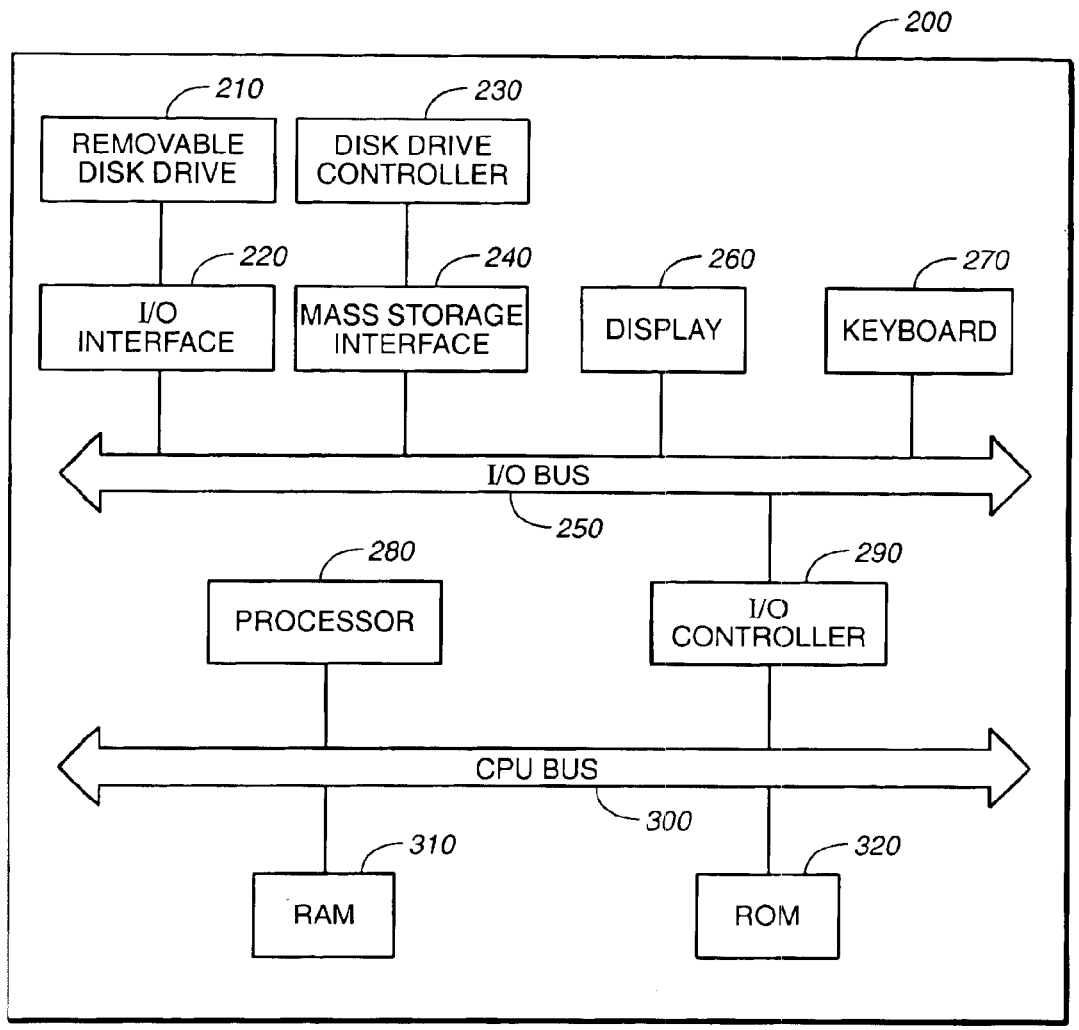
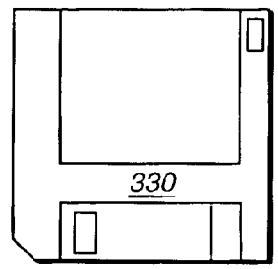
FIG._7

DESCRIBING DOCUMENTS AND EXPRESSING DOCUMENT STRUCTURE

BACKGROUND OF THE INVENTION

The present invention relates to computer file formats and methods and apparatus for describing documents and expressing document structure.

Computer content authoring application programs, such as word processing applications and spreadsheet applications, produce content having varying levels of structure. Furthermore, different authoring applications store content and structural information using different file formats. Typically, the file format used by one authoring application is not understood by other authoring applications. As a result, the content and structural information stored in a file is typically accessible only to the authoring application that produced the file and to other authoring applications which have been specifically designed to understand the file format of the file. Authoring applications which have not been specifically designed to understand the file format of the file may be able to retrieve the content stored in the file, but typically will not be able to retrieve the structural information stored in the file.

In networked environments where there is a large amount of communication among applications and among computers, requiring each application to understand the file formats used by other applications is becoming increasingly unwieldy and inefficient. One method which has been used to address this problem is the use of a "universal" file format which attempts to encapsulate all possible content and structural information that can be generated by any application program. Files stored in such a format, however, tend to be large, and cannot be guaranteed to be capable of encapsulating information generated by future versions of application programs.

SUMMARY OF THE INVENTION

In one aspect, the invention features a method of describing the hierarchical structure of a document having content of a characteristic type of content, comprising: expressing, independently of the document content type, the hierarchical structure of the document as a tree structure of one or more nodes; and providing a semantic representation for interpreting the tree structure.

Each tree node may be associated with an attribute describing the semantic character of the associated tree node. The semantic representation may be provided based upon the document content type. The semantic representation may be provided independently of the document content. The semantic representation may define parent-child relationships among the nodes. The expressing step may comprise associating with a node a child-count attribute indicative of whether the node has associated child nodes that have not yet been expressed in the tree structure.

The hierarchical structure of the document may be expressed, independently of the document content type, as a second tree structure of one or more nodes, and the second tree structure may be interpreted in accordance with a second semantic representation which is different from the first semantic representation. The expressing step may comprise associating with a given node an attribute identifying a second semantic interpretation for the structural feature of the document represented by the given node, the second semantic interpretation being different from the first semantic interpretation.

The hierarchical structure of the document may be recorded on a computer-readable medium.

In another aspect, the invention features a method of extracting content from a document having content of a characteristic type of content, comprising: providing access to document content in response to a request for document content based upon an expression of the hierarchical structure of the document that is independent of document content type and has an interpretation controlled by a semantic representation.

The requested document content may be provided, Or a pointer to the requested document content may be provided. The access to document content may be provided in response to a client request.

In another aspect, the invention features a method of describing the hierarchical structure of a document having content of a characteristic type of content, comprising: in response to a client request for information relating to the hierarchical structure of the document, expressing, independently of the document content type, the hierarchical structure of the document as a tree structure of one or more nodes; and providing a semantic representation for interpreting the tree structure.

The client request may comprise a request for information relating to the position of one or more nodes within the tree structure. The expressing step may comprise expressing the hierarchical structure of the document at a level of detail specified in the client request. The expressing step may comprise associating with a given node an attribute indicating the relative detail level represented by the given node. In response to a client request for structural information about the given node at a level of detail that is different from the level of detail indicated by the attribute associated with the given node, the hierarchical structure of the document may be expressed, independently of document content type, as a tree structure of one or more nodes, including the given node, at the detail level specified in the client request.

The expressing step may comprise associating with a given node an attribute identifying a second semantic representation for the structural feature of the document represented by the given node, the second semantic interpretation being different from the first semantic interpretation. In response to a client request, the second semantic representation for interpreting the given node may be provided. In response to a client request, access to document content may be provided based on the second semantic representation.

In yet another aspect, the invention features a document description file, stored on a computer-readable medium, for describing the hierarchical structure of a document having content of a characteristic type of content. The document description file comprising: a tree structure of one or more nodes expressing, independently of the document content type, the hierarchical structure of the document; and a semantic representation for interpreting the tree structure.

An attribute may be associated with each tree node that describes the semantic character of the associated tree node. The semantic representation may be based upon the document content type. The semantic representation may be independent of the document content. The semantic representation may define parent-child relationships among the nodes. A child-count attribute may be associated with a node that is indicative of whether the node has associated child nodes that are not yet expressed in the tree structure.

A second document description file may be provided comprising: a second tree structure of one or more nodes expressing, independently of the document content type, the hierarchical Structure of the document; and a second semantic representation which is different from the first semantic representation for interpreting the second tree structure.

An attribute may be associated with a given node identifying a second semantic interpretation for the structural feature of the document represented by the given node, the second semantic interpretation being different from the first semantic interpretation.

In another aspect, the invention features a document description file, stored on a computer-readable medium, for describing the hierarchical structure of a document having content of a characteristic type of content, comprising: a tree structure of one or more nodes expressing, independently of the document content type, the hierarchical structure of the document; a semantic representation for interpreting the tree structure; and information relating to document content within the hierarchical structure expressed by one or more tree nodes produced in response to a client request for document content associated with one or more tree nodes.

The information relating to document content may comprise a pointer to the requested document content. The information relating to document content may comprise the requested document content.

The invention also features a document description file, stored on a computer-readable medium, for describing the hierarchical structure of a document having content of a characteristic type of content, comprising: a tree structure of one or more nodes expressing, independently of the document content type, the hierarchical structure of the document, the tree structure being produced in response to a client request for information relating to the hierarchical structure of the document; and a semantic representation for interpreting the tree structure.

The tree structure may express the hierarchical structure of the document at a level of detail specified in the client request. An attribute may be associated with a given node indicating the relative detail level represented by the given node. A tree structure of one or more nodes, including the given node, may be provided that expresses, independently of document content type, the hierarchical structure of the document at a detail level specified in a client request for structural information about the given node, the requested detail level being different from the level of detail indicated by the attribute associated with the given node. An attribute may be associated with a given node identifying a second semantic interpretation for the structural feature of the document represented by the given node, the second semantic interpretation being different from the first semantic interpretation.

In another aspect, the invention features a method executed on a computer for generating a first document description file for describing a document stored on a computer-readable medium. The method generates a description of an application which produced the document, generates a description of a location from which the document can be obtained, and generates a description of an operation that can be performed on the document to produce a second document description file. The description of the location may be a uniform resource locator. The uniform resource locator may identify a server configured to produce the document upon request. The uniform resource locator may identify a location at which the document is stored. The content of the first document description file and the content of the second document description file may be represented in XML syntax.

The operation may be a transformation of the document from a file stored in a first storage format to a file stored in a second storage format, and the second document description file describes the file stored in the second storage format. The second document may describe the first document description file. The operation may extract information from the document, and the second document description file describes the information extracted from the document. The second document description file may describe the first document description file. The information extracted from the document may describe a range of pages of the document. The document may represent a multi-layered graphical object, and the information extracted from the document describes a subset of the layers of the multi-layered graphical object.

The method of may generate application-specific data describing the document. The application-specific data may be a name of an application that produced the document. The application-specific data may be a version number of an application that produced the document.

The method may generate a field containing information describing the document. The field may be an HTTP header. The field may describe a date on which the document was produced. The field may describe a date on which the document was modified. The field may describe a size of the document. The field may describe content contained in the document.

In another aspect, the invention features a method for processing a request document description file stored on a computer-readable medium, the request document description file describing a source document and an operation to be performed on the source document. The request document description file is received from a client, the source document is retrieved, the operation is applied to the source document to produce information derived from the source document, and a response document description file is generated containing a description of the information derived from the source document.

The information derived from the source document may be a result document. The response document description file may be a pointer to the result document. The description of the information derived from the source document may be the result document. The description of the information derived from the source document may be a pointer to the result document. The pointer may be a uniform resource locator. The response document description file may be generated by generating a description of the source document. The description of the source document may be the source document. The description of the source document may be a pointer to the source document. The pointer may be a uniform resource locator. The response document may be transmitted to the client. The information derived from the source document may be transmitted to the client.

In another aspect, the invention features a document description file, stored on a computer-readable medium, for describing a document stored on a computer-readable medium, the document description file containing a description of an application program which produced the document, a description of a location from which the document can be obtained, and a description of an operation that can be performed on the document to produce a second document description file. The operation that can be performed on the document may be a transformation of the document from a file stored in a first storage format to a file stored in a second storage format, and the second document description file describes the file stored in the second storage format. The operation that can be performed on the document may be extraction of information from the document, and the second document description file describes the information extracted from the document. The document description file may contain a description of an operation to be performed on the document.

A document description format (DDF) file encapsulates the location of a document along with useful descriptive information about the document. This enables authoring applications to capture and export information about content without requiring changes to current authoring application file formats. A DDF can be used as a virtual document to capture as much or as little information about data contained in a native authoring application file as is desired by the application and/or user.

Among the advantages of the invention are one or more of the following:

One advantage of the invention is that the content of a document description format (DDF) file is independent of the authoring application used to produce the file described by the DDF. Different authoring applications can therefore use DDF files to cooperatively manipulate, synthesize, and exchange document data. Although DDFs are independent of application-specific data, application-specific data can optionally be encapsulated within a DDF in order to optimize certain operations.

Another advantage of the invention is that the size of a DDF file is typically much smaller than the document which it describes. A typical DDF file is a few hundred bytes long. This aspect of the invention is particularly advantageous when used in conjunction with files, such as multimedia files, which are typically very large. Because the size of a DDF file is independent of the size of the file described by the DDF, the size of a DDF file will typically not increase if the size of the document described by the DDF increases. Local storage of DDF files instead of native files can therefore result in significant storage savings.

Another advantage of the invention is that, as a result of the small size of DDF files, exchange of DDF files is more efficient than exchange of the native files described by the DDFs. Many user-level manipulation tasks involve retrieving a diverse set of data items, assembling them, filtering out certain data items, and eventually creating a data aggregation consisting of the data items of interest. The intermediate steps of such operations can be performed more efficiently by using DDFs than by using native files, because of the small size of DDF files and the selective encapsulation of structural information and meta-data provided by DDFs.

Another advantage of the invention is that DDF-aware clients, servers, and applications use late binding, i.e., a reference within a DDF to a native file is not bound to the content of the native file until it is actually necessary to access such content, such as when the file is to be printed. Use of late binding reduces the number of temporary files that are produced when performing a series of operations on a file, thereby increasing the efficiency of such operations.

Another advantage of the invention is that implementing use of the document description format requires minimal modifications to existing application programs. A simple plug-in to an existing application program can be used to enable the application program to save descriptions of existing documents. DDF client software running on a client workstation manipulates DDF files and handles client-server DDF transactions without requiring any modification to existing application programs.

Another advantage of the invention is that it makes more efficient use of client resources. For many transactions, clients need only store and exchange DDF files which are typically much smaller than the application-specific files to which they correspond. Furthermore, because all processing of application-specific files is performed by application-specific servers, the number of authoring applications that clients need to store and execute is reduced. Furthermore, application-specific servers can be optimized to process files produced by specific applications, thereby increasing processing efficiency.

Other features and advantages of the invention will become apparent from the following description, including the drawings and the claims.

BRIEF DESCRIPTION OF THE DRAWINGS

FIG. 1A is a schematic view of a document.

FIG. 1B is a schematic view of a tree structure expression of the structure inherent in the document of FIG. 1A.

FIG. 1C is a schematic view of the tree structure of FIG. 1B and a semantic representation for interpreting the tree structure.

FIG. 1D is a schematic view of the tree structure and semantic representation of FIG. 1C expressed at a level of detail that is less than the level of detail expressed in FIG. 1C.

FIG. 2 is a block diagram of a network configured to reveal document structure.

FIG. 3 is a flow diagram of a method of revealing document structure

FIG. 4 is a block diagram of a network and computer hardware and software configured to manipulate document description format files.

FIG. 5 is a block diagram of the communications that take place among a subset of the elements shown in FIG. 4.

FIG. 6 is a flowchart of a method for applying a transformation to a document description format file.

FIG. 7 illustrates a computer and computer elements suitable for implementing the invention.

DETAILED DESCRIPTION

The following section describes the general features of a method for expressing the structure of a document. This section is followed by a description of a method for describing documents using a novel document description format (DDF) and a method for expressing document structure within the context of that format.

General Features of a Scheme for Revealing Document Structure:

Referring to FIG. 1A, a document 100 (e.g., an article created by the Adobe® rameMaker° authoring program) has an inherent nested (or hierarchical) structure. Document 100 is composed of a general heading 102 which is nested within an article 104. Sections 106, 108 are nested within general heading 102. Paragraphs 110 and 112 are nested within a sub-heading 114 which, in turn, is nested within section 106. Paragraph 116 and graphic 118 are nested within a sub-heading 120 which, in turn, is nested within section 108. Graphic 118 is composed of nested layers 122, 124.

As shown in FIG. 1B, the hierarchical structure of document 100 may be expressed independently of the document content type as a tree structure 126 of one or more nodes. The hierarchical structure of Document 100 is expressed by the parent-child relationships established in tree structure 126. Thus, nodes 2.11 and 2.12 depend from, or are the "children" of, Node__2.10. Similarly, nodes 2.21 and 2.22 are the children of Node 2.20, and nodes 2.1 and 2.2 are the children of Node__1.10. Node__2.22 is the parent node for nodes 2.221 and 2.222. The parent-child relationships defined by the nodes of tree structure 126 are expressed independently of the type of content in document 100—i.e., the tree structure encapsulates only the hierarchical structure of document 100, not its content. For example, nodes 2.221 2.222, which correspond to layers 122, 124 of graphic 118, are expressed as the children of Node__2.22 in the same way as Node__2.11 and Node 2.12, which represent paragraphs 110, 112, are expressed as the children of Node__2.10.

The features of tree structure 126 are controlled by a semantic representation which attaches a meaning to each of the nesting levels within the tree structure. The meaning of the nesting levels will generally vary with the type of content in document 100. For example, documents created by the Adobe® FrameMaker® authoring program are likely to have chapters and sections, whereas documents created by the Adobe® Photoshop® authoring program or the Adobe® Illustrator® authoring program are likely to be composed of layers. The semantic representation therefore provides an interpretation of the tree structure of parent-child nodes. Different semantic representations may be used to express the structure of the same document instance. In other words, the hierarchical structure of a particular document may be expressed by more than one tree structure and associated semantic representation. For example, the hierarchical structure of a document created by the Adobe® FrameMaker® authoring program also may be expressed in terms of chapters and sections or, alternatively, in terms of pages each of which has its own independent hierarchical structure.

A particular expression of the hierarchical structure of a document may be interpreted by associating name attributes (or "labels") with each of the tree nodes in accordance with a suitable naming model (or "namespace") which is, at least in part, selected based upon the type of content contained within the document. For example, a suitable namespace for document 100 may include the attributes identified in Table 1.

TABLE 1

A semantic representation for a document created by the Adobe ® FrameMaker authoring program.

| Attribute Label | Attribute Meaning |
| --- | --- |
| DIVISION | A sequence of SECTIONS. |
| SECTION | A sequence of PARAGRAPHS and FIGURES |
| PARAGRAPH | Text content |
| HEADING | Text content identifying DIVISIONS & SECTIONS |
| FIGURE | A sequence of LAYERS |
| LAYER | Graphic content |

As shown in FIG. 1C, an expression 128 of the hierarchical structure of document 100 includes a tree structure of one or more nodes and a set of namespace attributes which are associated with the tree nodes and identify the semantics of the structural features of document 100 that are represented by the tree nodes. For example, expression 128 includes Node__2.10 and an associated HEADING attribute, which together express the structure of section 106 of document 100 by the position of Node__2.10 in the tree structure and the meaning associated with the attribute HEADING.

Expression 128 represents a generic way to encode hierarchical structures and their associated meta-data. Each node in this structure reveals its position in the logical structure through an associated namespace attribute. In the embodiment presented in Table 2 below, a suitable namespace includes several models that contain document content classifications which express different levels of detail. The models follow a simple inheritance hierarchy whereby every model is also a member of its parent model. For example, RasterGfxCModel is also a GfxCModel and a CModel; that is, everything that can be classified with the RasterGfxC-Model can also be classified with the GfxCModel and the CModel. This inheritance scheme allows structural expression applications to express the hierarchical structure of a document with a relatively specific level of detail, while allowing clients reading the structure to deal with structural elements more generally. For example, a full-text search engine might not need to distinguish between a HEADING and a PARAGRAPH in a document structure expressed using the FlowTxtCModel. In such a situation, the search engine may simply treat all classifications as if they were a classification (e.g., TEXT) in the parent model TxtCModel.

TABLE 2

Namespace models. The model names and classifications are marked in bold-face font and are followed by a brief description of their characteristics.

| Root Model | All Content Models | Specific Content Models | Classification |
| --- | --- | --- | --- |
| Model: root of all models | | | DOCUMENT: a structured document |
| | | | ELEMENT: an element |
| | | | PORTFOLIO: collection of structured elements |
| | | | REFERENCE: indirect reference to an element in another Portfolio |
| | | | UNKNOWN: element of unknown classification |
| | CModel: all content models | | CONTENT: all sub-models are content models |
| | | | UNBOUND: for content that is explicitly unspecified |
| | | | UNIT: collection of content elements treated as a single unit |
| | | DynCModel: dynamic media content | CLIP: a time-based sequence |
| | | | OVERLAY: overlay |
| | | | TIMEBASE: time-base |
| | | AudioDynCModel: audio content | CHANNEL: a stream of audio data |
| | | VideoDynCModel: video content | TRACK: a stream of video data |
| | | GfxCModel: graphics content | FIGURE: graphics content |
| | | | TEXTURE: texture |
| | | DocGfxCModel: final form document content | PAGE: a printable page |
| | | LayeredGfxCModel: layered graphics content | LAYER: a layer |
| | | MultiGfxCModel: multi-model graphics | ARTWORK: an artwork view |
| | | | PREVIEW: preview |
| | | | WIREFRAME: wireframe view |
| | | RasterGfxCmodel: raster graphics content | COLORCHAN: a color channel |
| | | | RASTER: raster graphic (bitmap) |
| | | TriDGfxCmodel: 3D graphics content | LIGHT: a light source |
| | | | POLYGON: polygon in 3-space |
| | | | TRIDMODEL: 3D model |
| | | | VERTEX: vertex in 3-space |
| | | VectorGfxCModel: vector graphics content | CURVE: curve |
| | | | LINE: line |
| | | | PATH: path |
| | | | POINT: point |
| | | LinkCModel: hyperlink content | LINK: a link |
| | | TxtCModel: text content | TEXT: any kind of human-readable text |
| | | | TCODE: encoded data, such as JavaScript |
| | | FlowTxtCModel: flowing/structured text content | ARTICLE: a sequence of sections, with optional heading |
| | | | FOOTNOTE: footnote |
| | | | HEADING: an article, section, or list |
| | | | LABEL: text label |
| | | | LIST: list of items, with an optional heading |

TABLE 2-continued

Namespace models. The model names and classifications are marked in bold-face font and are followed by a brief description of their characteristics.

| Root Model | All Content Models | Specific Content Models | Classification |
|---|---|---|---|
| | | | LIST_ITEM: item in a list |
| | | | PARA: paragraph, a unit of text |
| | | | SECTION: logical division, with an optional heading |
| | | PlacedTxtCModel: decorative/unstructured text content | ART_TEXT: text as art, such as letter forms |
| | | | PRE: pre-formatted text |

Other namespace are possible. For example, Tables 3–7 below contain exemplary semantic representations for sheet music, a simple text document, a COBOL program, and poetry. Tables 4 (simple text document) and (COBOL program) contain parallel semantic representations: although they have the same attribute labels, the semantics are very different. Tables 6 and 7 contain semantic representations that have different vocabularies for the same content type (i.e., poetry). A server could use either semantic representation to expose the structure of a poem. In some embodiments, a client may select the semantic representation used to decompose the structure of a poem.

TABLE 3

A semantic representation for sheet music.

| Attribute Label | Attribute Meaning |
|---|---|
| SCORE | An entire work of music |
| PART | The part for a particular instrument |
| STAFF | A sequence of MEASURES |
| REPEAT | A subsection of a STAFF to be repeated |
| CODA | A continuation section of a STAFF |
| MEASURE | A sequence of NOTES |
| NOTE | A representation of pitch (including silence) and duration |

TABLE 4

A semantic representation for a simple text document.

| Attribute Label | Attribute Meaning |
|---|---|
| DIVISION | A sequence of SECTIONS. |
| SECTION | A sequence of PARAGRAPHS |
| PARAGRAPH | A sequence of SENTENCES |
| SENTENCE | Text content |

TABLE 5

A semantic representation for a COBOL software program.

| Attribute Label | Attribute Meaning |
|---|---|
| DIVISION | A sequence of SECTIONS. |
| SECTION | A sequence of PARAGRAPH |
| PARAGRAPH | A sequence of SENTENCES |
| SENTENCE | Code verbs and statements |

TABLE 6

A semantic representation for poetry.

| Attribute Label | Attribute Meaning |
|---|---|
| BOOK | A sequence of CANTOS. |
| CANTO | A sequence of VERSES |
| VERSE | A line of poetic text content |

TABLE 7

Another semantic representation for poetry.

| Attribute Label | Attribute Meaning |
|---|---|
| VOLUME | A sequence of POEMS. |
| POEM | A sequence of PASSAGES |
| PASSAGE | A sequence of LINES |
| LINE | A verse of poetic text content |

A tree structure encodes a specific structural decomposition of a document instance. Where multiple orthogonal structural decompositions exist, each decomposition can be expressed by a different synchronous, tree structure. For example, a picture can be decomposed into LAYERS, each of which can also play the role of a RASTER. Each synchronous tree structure can be represented by a separate structural decomposition. Alternatively, a node in a tree structure may include a ROLE attribute which identifies the various other roles played by the structural feature represented by that node. Attribute ROLE provides alternative interpretations of the structural feature corresponding to a given node. Referring to FIG. 1C, layers 122, 124 of FIG. 1A each play the role of a RASTER in addition to its role as a LAYER, as indicated by the ROLE attributes associated with Node__2.221 and Node__2.222. The client may use the ROLE attribute in many ways. For example, a client may use the ROLE attribute to specify the form in which content corresponding 10 a particular node should be extracted from a document. A client may also use the ROLE attribute to enumerate certain structural features in a document (e.g., the number of chapters in a document).

As much or as little of the structure of a document may be exposed as is needed. A CHILD-COUNT node attribute is associated with each node to indicate the relative level of detail that is expressed by a particular tree structure. In one implementation, a non-zero CHILD-COUNT value indicates that there is additional structure which is not revealed in a given tree structure. As shown in FIG. 1D, Node__2.10 and Node__2.20 each has an associated CHILD-COUNT value of 2, indicating that each of these nodes is the parent of two child nodes which are not revealed in structural expression 134. In particular, nodes 2.11 and 2.12, which are the children of Node__2.10 and nodes 2.21 and 2.22, which are the children of Node__2.20, are not revealed in structural expression 134. Applications that provide access to such structural expressions may invoke a method which transforms a given structural expression into a new expression which exposes the tree structure to the desired level of detail.

In addition to expressing structure through a tree structure and an associated semantic representation, the structural expression also provides access to document content corresponding to one or more nodes in the tree structure (e.g., to extract the text of paragraph 110). The access to document content may be incorporated into the file containing the structural expression either by value 0r by reference. Incorporation by value involves copying the desired document content into the structural expression file. Incorporation by reference involves placing within the structural expression file a URL (uniform resource locator) that points to the desired document content.

Referring to FIG. 2, in a client-server implementation, a client workstation 150 running an authoring application 152, such as a word processing authoring application or a graphics authoring application, may produce a document having content of a characteristic type, and may save the document in a file 154 on a disk 156. Client 150 may access the content of document file 154 by instructing authoring application 152 to load document file 154 from disk 156 into the memory of client 150, where a user may access or modify the content of document file 154 with authoring application 152.

A user may also instruct authoring application 152 to store on disk 156 an expression of the hierarchical structure of document file 154. Authoring application 152 may invoke a structural expression plug-in 157, residing on client workstation 150, to create a meta-data summary file 158 which encodes the hierarchical structure and associated meta-data of the document. Authoring application 152 exposes as much (or as little) of the hierarchical structure of document file 150 as is appropriate for a specific document instance. Structural expression plug-in 157 indicates when additional structural information may be revealed upon client request by associating a non-zero CHILD-COUNT attribute with those nodes that have one or more children which are not expressed in the current meta-data summary file. Structural expression plug-in 157 enables authoring application 152 to save and retrieve meta-data summary files without requiring any modifications to authoring application 152. Structural expression plug-in 157 also allows a user to specify a position in the tree structure revealed in meta-data summary file 158 and a desired expression depth. In response to such a specification, structural expression plug-in 157 transforms meta-data summary file 158 into a new summary file that exposes the tree structure to the desired level of detail.

In an alternative embodiment, structural expression plug-in 157 may save information to and retrieve information from transitory data structures in the memory of client 150 rather than storing meta-data summary files on disk 156. A separate application or script may provide a batch operation to produce meta-data summary files corresponding to pre-existing document files. Also, rather than using structural expression plug-in 157, authoring application 152 may be modified to enable a user to save and retrieve meta-data summary files directly.

Another client 151 may access information relating to the hierarchical structure of document file 154 by invoking one or more methods 159 residing on server 160. In particular, client 150 sends to server 160 a request 162 for information about the hierarchical structure of document file 154. As discussed above, request 162 may specify the level of detail at which the structural information should be presented. In response, server 160 invokes one or more methods 159 to retrieve or otherwise manipulate meta-data summary file 158. Server 160 may send to client 151 a response 166 that contains information about meta-data summary file 158.

Response 166 may encapsulate the entire meta-data summary file, or the response may simply contain a reference to the storage location of the meta-data summary file on disk 156. Client 151 may access meta-data summary file 158 through authoring application program 153 or through a web browser program residing on client workstation 151.

In addition to being implemented in a client-server environment, the invention may be implemented in a stand-alone environment. For example, methods 159 may reside in client workstation 150, and document file 154 and meta-data summary file 158 may be stored in memory located in client workstation 150.

Referring to FIG. 3, in a method of describing the hierarchical structure of a document, a client may access information relating to the hierarchical structure of the document as follows. In response to a client request (step 170), the hierarchical structure of the document is expressed, independently of document content type, as a tree structure of one or more nodes and an associated semantic representation (step 172). If the initial, or a subsequent, client request specifies the level of detail at which the hierarchical structure of the document should be expressed, either for a particular node or for the entire tree structure (step 174), the structural expression is transformed into a new expression of the document structure at the requested level of detail (step 176). If the client request for information relates to a second semantic role played by a particular node (step 178), the hierarchical structure of the document is then expressed, independently of document content type, as a second tree structure of one or more nodes that is controlled by a semantic representation corresponding to the second semantic role played by that node (step 180). If the client request relates to document content corresponding to a particular node (step 182), the client is provided access to the requested content, either by value or by reference (step 184).

A Document Description Format:

A Document Description Format (DDF) is a method for describing a document using a mark-up language that identifies the components of individual native files that are included in a document by reference to the descriptive information (e.g., source location, portions of the source to be included, and mime type) of the compiled document.

Referring to FIG. 4, an authoring application APP1 12, such as a word processing application or a graphics application, resides on a client workstation 10. A user uses the authoring application 12 to produce a document having raw information content, and to save the content on a local disk 16 in a file 18 formatted in a native file format of the authoring application 12. If the user desires to access the native APP 1 file 18, the user instructs the authoring application 12 to load the native file 18 from the disk 16 into the memory of the client workstation 10. The user may then manipulate the file 1 8 in the memory of the client workstation 10 using the authoring application 12.

Also residing on the client workstation 20 is a document description format (DDF) plug-in 14 to the authoring application 12. A DDF file, described in more detail below, provides an application-independent description of a document saved in a native file format of an authoring application program. The DDF plug-in 14 provides the authoring application 12 with the ability to save and retrieve DDF files without requiring any modifications to the authoring application 12. Alternatively, the DDF plug-in 14 may save information to and retrieve information from transitory data structures in the memory of the client 10, rather than using DDF files. A separate application or script (not shown) provides a batch operation to produce DDF files corresponding to pre-existing native files.

The DDF plug-in 14 interacts with the user by, for example, adding a command to the authoring application 12 which allows the user to save a DDF file corresponding to the file currently open in the authoring application 12. In the case of an authoring application which uses a graphical user interface (GUI), the added command may take the form of a "Save DDF file" menu item in the authoring application's "File" menu. A user's selection of this menu item from within the authoring application 12 causes the DDF plug-in 14 to produce a DDF file 20 describing the native file 18, and to optionally prompt the user for additional meta information (e.g., the author's name). The user could also be provided with an option to have the authoring application's default "save file" operation always generate an accompanying DDF file. Alternatively, instead of using the DDF plug-in 14, the authoring application 12 may be modified to allow the user to save and retrieve DDF files.

As previously noted, a DDF file describes a document produced by an authoring application. The document described by a DDF file is referred to as the "referenced document" of the DDF file. A DDF file contains three kinds of information about the DDF file's referenced document: (1) meta information such as the location and authoring application of the referenced document; (2) method declarations enumerating the operations that can be performed on the referenced document; and (3) optional application-specific data describing the referenced document.

Referring to FIG. 5, the authoring application APP1 12 saves content in native file 18. The authoring application APP1 12 uses DDF plug-in 14 to save a DDF file 20 describing the native file 18. A user of authoring application APP2 32, residing on client workstation 30, desires to obtain a copy of native file 18 transformed into Graphics Interchange Format (GIF). The user instructs DDF client software 34, residing on client workstation 30, to construct a request DDF file 42, containing a request to transform native file 18 into GIF format, from the information contained in APP1 DDF file 20. DDF client software 34 transmits the request DDF file 42 to APP1 DDF servlets software 26, residing on an APP1 server 24. Alternatively, DDF client software 34 transmits the APP1 DDF file 20 and a separate request (not shown) to APP1 DDF servlets software 26.

APP1 DDF servlets software 26 transforms the native APP1 file 18 into GIF format and stores the resulting GIF file 22 on disk 16. APP1 DDF servlets software 26 constructs a response DDF file 44, which encapsulates the request DDF file 42 and describes the GIF file 22, and transmits the response DDF file 44 to the DDF client software 34. The DDF client software 34 transmits information contained within the response DDF file 44, such as the location of the GIF file 22, to the authoring application APP2 32. Authoring application APP2 32 uses standard web browser software 36, residing on client workstation 30, to retrieve the GIF file 22.

In one implementation, a DDF file minimally contains: (1) header fields, such as Hypertext Transfer Protocol (HTTP) 1.1 header fields, describing properties of the referenced document, such as its title and the date on which it was produced; (2) a field specifying the authoring application that produced the referenced document; and (3) an address or location of the referenced file, such as a Uniform Resource Locator (URL). An example of a DDF file that references a document created by the Adobe® Photoshop(® authoring program is shown in Table 8.

TABLE 8

```
<DDF>
    <URL VALUE="http://www.company.com/doc.psi"/>
    <Date VALUE="Mon Aug 4 09:48:55 PDT 1997 "/>
    <Title VALUE="Picture of House"/>
    <Content-type VALUE="Application/vnd.adobe-photoshop"/>
    <Methods>
        <Transformation NAME="PhotoshopToGif"
            RETURN-TYPE = "Image/Gif"
            PROVIDER = "http://ddf.company.com/ptg.class"/>
        />
        <Information NAME="EnumLayers"
            RETURN-TYPE = "Layers"
            PROVIDER = "http://ddf.company.com/el.class"/>
        />
    </Methods>
    <Application-data>
        <Application-name VALUE="Adobe Photoshop"/>
        <Application-version VALUE = "4.0"/>
    </Application-data>
</DDF>
```

As shown in Table 8, all DDF elements (e.g., "DDF", "Methods") are encoded in Extensible Markup Language (XML) syntax, and can therefore be parsed by a conforming XML parser even if that parser does not understand the semantics of application-specific data contained in the DDF file. DDF element and attribute names are case insensitive.

In the DDF file shown in Table 8, the element labeled DDF indicates that the file is a DDF file. The VALUE attribute of the URL element specifies the location of the DDF file's referenced document. The VALUE attribute of the Content-type element indicates the Multipurpose Internet Mail Extensions (MIME) content type of the referenced document.

The optional Application-data element contains information about the referenced document that is specific to the authoring application that produced the referenced document. For example, Application-data might include information about the individual layers of a multi-layered object produced by a graphics application, or information about the location of tab stops in a word processing document. Any information contained within the Application-data element need only be capable of being understood by components that directly manipulate the referenced document (e.g., the application APP1 DDF servlets 26 shown in FIGS. 4 and 5). Specifically, DDF client software 34 need not understand the information contained within the Application-data element in order to property process and manipulate DDF files. Note that DDF files which do not contain an Application-data element still contain sufficient information to enable the retrieval of all application-specific information relating to a referenced document by making a request to an appropriate application-specific server.

The optional Methods element declares methods that can be performed on a DDF file's referenced document to produce information derived from the referenced document. A method may be either a transformation or an information method, as indicated by the TRANSFORMATION and INFORMATION elements, respectively. Transformation methods, when applied to a source DDF, return a response DDF file that describes a transformation of the source DDF's referenced document. Alternatively, a transformation method may return the actual result of applying the transformation method to the referenced document. For example, the transformation method declared by the Transformation element in the DDF file shown in Table 8 transforms the DDF file's referenced document (an Adobe® Photoshop® file) into a Graphics Interchange Format (GIF) file, and returns the resulting GIF file. Information methods, when applied to a source DDF, return a response DDF file that contains additional information about the source DDF's referenced document. For example, application of the Information method declared in the DDF file shown in Table 8 to a source DDF produces a response DDF file containing a LAYERS element which contains information about the layers in the source DDF's referenced document (an Adobe® Photoshop® file).

Both TRANSFORMATION and INFORMATION elements may contain a NAME attribute (describing a name of the method declared by the element) and a PROVIDER attribute (providing a pointer to an implementation of the method declared by the element). Both Transformation and Information elements may have a RETURN-TYPE attribute. For Transformation elements, the RETURN-TYPE attribute specifies the MIME type of the document returned when the method declared by the element is applied. For example, in the DDF file shown in Table 8, the RETURN-TYPE of the Photoshop transformation method is "Image/Gif," indicating that the result of applying the Photoshop to Gif method is a GIF image. For Information elements, the RETURN-TYPE attribute specifies the name of the DDF element whose content is returned as a result of applying the Information method. For example, the RETURN-TYPE of the Information element in the DDF file shown in Table 8 is "Layers." This indicates if a request DDF file, requesting execution of the "EnumLayers" Information method, is transmitted to an appropriate Photoshop server, the resulting response DDF file will contain a Layers element containing information about the layers of the Photoshop document referenced by the DDF file shown in Table 8. Attributes common to all methods within a Methods element are optionally listed once as attributes of the enclosing Methods element.

Message-IDs may be used to uniquely identify DDF files participating in client-server transactions. Message-IDs are generated in a manner analogous to Message-IDs used in Internet email and Usenet articles. The Request-ID element is a Message-ID used by the DDF client 34 to uniquely identify a request DDF file being submitted to a server. The response DDF file generated in response to such a request DDF file is guaranteed to contain this Request-ID in order to assist the DDF client 34 in associating the response DDF file with the request DDF file. The Response-ID element is a Message-ID used to uniquely identify a response DDF file. Such a Response-ID may be used by the DDF client 34 when submitting future requests for the same resource to the server.

Other elements which may be included in a DDF file include, but are not limited to:

Last-modified, indicating the time that the referenced document was last modified. The format and meaning of this field are analogous to the HTTP/1.1.

Title, indicating a title to associate with the DDF.

Date, indicating that time of creation of the DDF.

Resource-expires, indicating the time that the referenced document expires on the hosting server.

If-modified-since, used in DDF cache validation requests. The interpretation and function of If-modified-since is that same as in HTTP/1.1 Note that all dates within DDF elements use the syntax defined in the HTTP1.1 specification.

A DDF does not need to contain all of the information contained within the DDF's referenced document. Typically a DDF will contain only structural and meta information derived from the referenced document. A DDF can be thought of as a promise of service that manifests itself as the bits of the referenced document only when presented to an appropriate server with a request to produce the referenced document.

A Transformation Method:

FIG. 6 shows an approach for applying a transformation method to a DDF file. First, a user obtains a DDF file which will be referred to as the "source" DDF file (step 46). For purposes of this discussion, assume that the source DDF file in this case is the APP1 DDF file 20 shown in FIG. 5. Also, for purposes of this discussion, assume that the APP1 DDF file 20 is the DDF file shown in Table 8, in which the referenced document is an Adobe Photoshop document. The user obtains the source DDF file in any of a number of ways, for example, by browsing an online gallery of Photoshop images using a DDF-enabled web browser, selecting one of the Photoshop images, and selecting a "Save to DDF" menu item. The user stores APP1 DDF file 20 on local disk 38 for future use.

The user activates DDF client software 34 to generate request DDF file 42, encapsulating the source DDF file and a request to transform the source DDF file's referenced document into GIF format (step 48). In general, to apply a method within a DDF file to the DDF file's referenced document, a request DDF file containing an Expose-information element or an Apply-transformation element is produced. These are possibly empty elements that declare calls to an applicable Transformation or Information method declared by the DDF file. These elements are further qualified by appropriate attributes taken from the attribute list of the Transformation or Information method being applied. The DDF itself is an implicit first argument to the method. Additional arguments, if present, are encoded as the contents of the Arguments element of the enclosing DDF. For example, a minimal Apply-transformation element to convert a file into GIF format could appear in a DDF file as <Apply-transformation NAME="convertToGIF"/>. This Apply-transformation element would apply the method named "convertToGIF" to the DDF containing the Apply-transformation element.

In the case of a request to transform the Photoshop document described by the DDF file of Table 8, the request takes the form of an Apply-transformation element in the request DDF file 42. The request DDF file 42 encapsulates, within the Source-DDF element, the source DDF to which the Transformation method if to be applied. The source DDF may be incorporated within the Source-DDF element either by value or by reference. Incorporation by value involves copying the entire source DDF into the Source-DDF element. Incorporation by reference involves placing a URL, which points to the source DDF, within the Source-DDF element. The contents of the request DDF file 42 are shown in Table 9.

TABLE 9

```
<DDF>
    <Date VALUE="Mon, 28 Jul 1997 20:01:12 GMT"/>
    <Creating-Application VALUE="DDF Client"/>
    <Apply-Transformation NAME="PhotoshopToGif"
        Provider = "http://ddf.company.com/ptg.class"/>
    <Source-DDF>
        <!-- DDF of Table 8 is embedded by value here -->
    </Source-DDF>
</DDF>
```

The client transmits the request DDF file 42 to the location of the method provider indicated by the PROVIDER attribute of the appropriate Apply-transformation or Apply-information element of the request DDF file 42 (step 50). For example, referring to FIG. 4, the client 30 transmits the request DDF file 42 to application APP1 DDF servlets 26 over network 28. The APP1 DDF servlets 26 is a provider of a method to transform Photoshop files into GIF files. The method provider applies the requested transformation to the source DDF file's referenced document and produces a transformed file, which it stores locally (step 52). For example, referring to FIG. 4, the APP1 DDF servlets 26 transforms native file 18 from Photoshop format into a GIF file 22, stored on disk 16.

The method provider produces a response DDF file containing information about the transformed file, including a URL pointing to the location at which the transformed file is stored (step 54). In the case of FIG. 4, for example, APP1 DDF servlets 26 produces a response DDF file 44 (FIG. 5) containing a URL pointing to the GIF file 22. The response DDF file 44 is shown in Table 10.

TABLE 10

```
<DDF>
    <Date VALUE="Mon, 28 Jul 1997 20:06:12 GMT"/>
    <Last-Modified VALUE="Mon, 28 Jul 1997 20:05:12 GMT"/>
    <URL VALUE="http://ddf.company.com/house.gif"/>
    <TITLE VALUE="Picture of House"/>
    <Content-Type VALUE="Image/Gif"/>
    <Content-Length VALUE="55174"/>
    <Creating-Application VALUE="Photoshop Server"/>
```

TABLE 10-continued

```
<Source-DDF>
    <!-- DDF of Table 9 embedded by value here -->
</Source-DDF>
</DDF>
```

The method provider transmits the response DDF file 44 to the client 30 (step 56). The client 30 extracts the URL from the response DDF file 44 to request and obtain the transformed file (step 58). For example, referring to FIG. 4, the client 30 extracts the URL from the response DDF file 44 to request and obtain the GIF file 22 using standard web browser 36. Alternatively, in step 56, the method provider transmits the transformed file directly to the client 30 in order to eliminate an additional client-server transaction.

Subsequent requests to the same method provider by the same or a different client for a transformation of the same referenced document into GIF format may be satisfied by the method provider without performing step 52, because the transformed GIF file may already be accessible to the method provider from a previous transformation. The method provider may also obtain an existing GIF file from some other location. The method used by the method provider to obtain the transformed file in any particular case is transparent to the client.

The application-data field of the response DDF can be used to cache the results of applying a method to a source DDF. In the example above involving transforming a Photoshop file into a GIF file, the resulting GIF file is stored within the response DDF's Application-data element. Subsequent requests by the user for a transformation of the same Photoshop file to GIF format arc satisfied without accessing the server, because the GIF file being cached within the Application-data element of the response DDF can be extracted by DDF client software 25 and returned directly to the user.

As shown in Table 10, a response DDF encapsulates, within the Source-DDF element, the source DDF to which the response DDF is a response. The source DDF may be incorporated within the Source-DDF element either by value or by reference. Embedding the source DDF within the response DDF (either by reference or by value) provides an audit trail of DDF transactions.

An Information Method for Revealing Document Structure:

As explained below, the DDF method enables a client to determine the hierarchy of information from within the document. From this information a client may extract relevant content information, and may deduce from the expressed structure whether the content at a particular level is the relevant information sought. The DDF method establishes a uniform method for revealing the structure of a document independently of the document content type. The structure meta-data may be extracted and included in a DDF representation of the document or in a portion of that representation. The DDF structural expression identifies a structural decomposition for a document, components of a document, or components of more than one document, and can accommodate documents of various types (e.g., text, image, graphics, and sound). This method provides a way to communicate the structure of any document content type to any client without regard to the client's intended use for this information.

As explained above, document content is meaningfully processed by it inherent nested structure. The meaning of these nesting levels varies between content types. DDF enables structural expression applications to expose intra-document structure by means of a DDF primitive STRUCTURE, which is a generic format for encoding hierarchical structures and their associated meta-data. Element STRUCTURE does not itself encapsulate the semantic interpretation of a particular decomposition; rather, it qualifies the decomposition by referring to one of several structure schema (discussed below). Intermediate and leaf nodes in this format are encapsulated in element TREE, which encapsulates only the structure of a document, not document content. Each node in this format reveals its position in the logical structure through an attribute IS-A. As explained above, hierarchical structure plays different roles, and a specific document instance may have one or more structure trees overlaid on it. Element STRUCTURE defines the meaning and interpretation of a structure hierarchy through a required SCHEMA attribute. Attribute SCHEMA specifies the semantics of a particular decomposition of a given document instance. That is, the SCHEMA attribute enables a client to meaningfully interpret the hierarchical structure encoded in element STRUCTURE. The semantic representation encoded in SCHEMA is generally content-type specific, but content-instance independent. The SCHEMA is therefore specific to the decomposition, not necessarily to the document instance. Attribute SCHEMA also serves to qualify the namespace for resolving the values of attribute IS-A on structure elements (e.g., whether a tree node corresponds to a chapter or a layer). The role of the SCHEMA attribute is to represent the fact that in one kind of decomposition, for example, chapters occur below parts and sections occur below children. Structural expression applications expose intra-document structure by invoking a DDF information method "getStructureInterpretation," which enables the application to express the structural meaning associated with a particular tree node. That is, a DDF server, knowing the structures of the hosted documents, either by having a resource that defines the structures of the hosted documents or extracts structures from the hosted documents, may incrementally reveal more and more of the structure depending upon the client initiated query.

The structure of FrameMaker® document 100 (FIG. 1A) may be represented as a DDF file, as shown in Table 11. Table 12 contains a structure whose decomposition was controlled by the namespace for sheet music (Table 3, above). This structure is elaborated down to the level of STAFF; further client requests would reveal MEASURE and NOTE nodes.

TABLE 11

DDF representation of the structure of Adobe ® FrameMaker ® document 100 of FIG. 1A.

```
<STRUCTURE schema="fm-report" is-a="Model.DOCUMENT">
    <TREE is-a="ARTICLE">
        <TREE is-a="HEADING" child-count="0"/>
        <TREE is-a="SECTION">
            <TREE is-a="HEADING" child-count="0"/>
            <TREE is-a="PARA" child-count="0"/>
            <TREE is-a="PARA" child-count="0"/>
        <TREE is-a="SECTION">
            <TREE is-a="HEADING" child-count="0"/>
            <TREE is-a="PARA" child-count="0"/>
            <TREE is-a="FIGURE" child-count="0"/>
                <TREE is-a="LAYER" child-count="0"/>
                    <ROLE is-a="raster"/>
        </TREE>
    </TREE>
</STRUCTURE>
```

TABLE 12

DDF representation of the structure of sheet music.

```
<STRUCTURE schema="sheet music" is-a="SCORE" child-count="1">
    <TREE node-id="a" is-a="PART" child-count="2"/>
        <TREE node-id="1" is-a="STAFF" child-count="180"/>
        <TREE node-id="2" is-a="STAFF" child-count="180"/>
    </TREE>
</STRUCTURE>
```

The structures of an Adobe® Illustrator® document and a PDF document may be represented as DDF files as shown in Tables 12 and 13, respectively. The Adobe® Illustrator® document has four layers, vector graphics, two embedded images, and a text box with editable text. The Adobe® PDF document is only partially exposed, as indicated by the non-zero CHILD-COUNT values; the pages of this document contain extractable text and raster images, but this structure is not revealed by the level of detail presented in the structural expression in Table 13.

TABLE 13

DDF representation of the structure of an Adobe ® Illustrator ® document.

```
<STRUCTURE schema="ai-file" is-a="Model.PORTFOLIO">
    <TREE is-a="LayeredGfxCModel.LAYER">
        <TREE is-a="CModel.UNIT">
            <TREE is-a="VectorGfxCModel.LINE" child-count="0"/>
            <TREE is-a="VectorGfxCModel.LINE" child-count="0"/>
            <TREE is-a="VectorGfxCModel.LINE" child-count="0"/>
            <TREE is-a="VectorGfxCModel.LINE" child-count="0"/>
            <TREE is-a="TxtCModel.TEXT" child-count="0"/>
        </TREE>
    </TREE>
    <TREE is-a="LayeredGfxCModel.LAYER">
        <TREE is-a="VectorGfxCModel.CURVE" child-count="0"/>
        <TREE is-a="VectorGfxCModel.CURVE" child-count="0"/>
        <TREE is-a="VectorGfxCModel.CURVE" child-count="0"/>
        ...
        <TREE is-a="VectorGfxCModel.CURVE" child-count="0"/>
    </TREE>
    <TREE is-a="LayeredGfxCModel.LAYER">
        <TREE is-a="RasterGfxCModel.RASTER" child-count="0"/>
    </TREE>
    <TREE is-a="LayeredGfxCModel.LAYER">
        <TREE is-a="RasterGfxCModel.RASTER" child-count="0"/>
    </TREE>
</STRUCTURE>
```

TABLE 14

DDF representation of the structure of an Adobe ® PDF document.

```
<STRUCTURE schema="pdf-doc" is-a="Model.DOCUMENT">
    <TREE is-a="DocGfxCModel.PAGE" child-count="3"/>
    <TREE is-a="DocGfxCModel.PAGE" child-count="3"/>
    <TREE is-a="DocGfxCModel.PAGE" child-count="5"/>
    <TREE is-a="DocGfxCModel.PAGE" child-count="1"/>
    <TREE is-a="DocGfxCModel.PAGE" child-count="3"/>
</STRUCTURE>
```

Thus, the hierarchical structure of a document may be revealed on a request-to-know basis. For example, the DDE instance for an encyclopedia may contain an element STRUCTURE that encodes the fact that the encyclopedia has twenty-six children. The associated SCHEMA captures the fact that the immediate children of an "Encyclopedia" are "Volumes." A client receiving such a DDF instance and wishing to learn more information about a particular child (i.e., volume) would submit a request DDF to a DDF-enabled application server for a DDF file that revealed more structure about that particular child. The DDF application server would examine the applications files making up the encyclopedia, discover that the requested child has, e.g., sixteen chapters, and record that information within element STRUCTURE in a reply DDF that would be returned to the client.

In a client-server implementation, the DDF method enables a client to receive basic structure information from a server-hosted document. The structure information may be mapped or reflect actual content of the queried document, independently of the document content type. Given a first-level revealing of the structure (and corresponding content), a decision may be made by the client whether a second-level revealing is sought. The server may then determine the various levels of a document's structure (and hence content) that can be revealed to the client. Thus, given a DDF server that contains structure information of a resident document, a query may be made of the DDF server to reveal information from the sought document. Given that a document's structure correlates to the content within it, by making a query on a structure-level basis, corresponding content may be incrementally revealed.

Structural expression applications reveal as much (or as little) of the tree structure as is appropriate for a particular document instance. Structural expression applications that expose the hierarchical structure of a document also support a DDF Information Method "revealStructure," which takes as arguments a position in the tree and a depth specification. The result of applying this transformation is a new DDF that exposes the tree structure at the level of detail requested by a client. Required attribute CHILD-COUNT on elements at the leaves of the exposed structure may be used by clients when deciding whether to ask for additional structural information about a document instance. In one implementation, a non-zero value of CHILD-COUNT indicates that additional structure may be revealed than is currently expressed.

Element STRUCTURE encodes a specific structural decomposition of a document instance. Where multiple structural decompositions exist, each structural decomposition may be expressed by separate STRUCTURE elements. Documents often decompose into multiple synchronous tree structures (e.g., a picture may be decomposed into three layers, where each layer may also play the role of a raster). In one implementation, an empty element ROLE may be used to declare the various other roles played by intermediate and leaf nodes in a structure tree.

Document management applications using DDF often need to encode properties—and more generally property hierarchies—that are specific to a given application domain. DDF enables structural expression applications to encapsulate such properties through a PROPERTIES element. This element may hold a property hierarchy and specify a schema for this hierarchy for use in a validating processor. There may be one PROPERTY element per unique properties schema. The PROPERTIES element may appear within the DDF TREE element, enabling structural expression applications to store properties about specific structural elements in the DDF, as shown in Tables 14 and 15, for example. Table 14 contains a DDF representation of the structure of a book containing two chapters with the structure exposed up to the chapter level. Non-zero values of attribute CHILD-COUNT indicate that there is more structure that can be revealed. Table 15 contains a DDF representation of the structure of an image containing two layers. Optional element ROLE indicates other semantic roles played by a specific structural unit.

TABLE 15

DDF representation of the structure of a book containing two
chapters with the structure exposed up to the chapter level.

```
<STRUCTURE schema="text-logical" is-a="book" child-count="2">
    <PROPERTIES>
        <PROPERTY name="title">Introduction</PROPERTY>
    </PROPERTIES>
    <TREE is-a="chapter" child-count="2">
        <PROPERTIES>
            <PROPERTY name="title">Welcome To Logical Structure</PROPERTY>
        </PROPERTIES>
    </TREE>
    <TREE is-a="chapter" child-count="3">
        <PROPERTIES>
            <PROPERTY name="title">Conclusion To Logical Structure</PROPERTY>
        </PROPERTIES>
    </TREE>
</STRUCTURE>
```

TABLE 16

DDF representation of the structure of an image containing two layers.

```
<STRUCTURE schema="image-structure" is-a="graphic" child-count="2">
    <PROPERTIES>
        <PROPERTY name="title">Picture Of Aster In Front Of Adobe Towers
</PROPERTY>
    </PROPERTIES>
    <TREE is-a="layer">
        <ROLE is-a="raster"/>
        <PROPERTIES>
            <PROPERTY name="title">Picture Of Aster Labrador</PROPERTY>
            <PROPERTY name="label">foreground</PROPERTY>
        </PROPERTIES>
    </TREE>
    <TREE is-a="layer">
        <ROLE is-a="raster"/>
        <PROPERTIES>
            <PROPERTY name="title">Picture of Adobe Towers</PROPERTY>
            <PROPERTY name="label">background</PROPERTY>
        </PROPERTIES>
    </TREE>
</STRUCTURE>
```

Other Methods:

Other operations may also be performed on DDFs. Consider a user who queries an database of graphical images. The user picks three images out of a set of the ten images that result from the query. Information about these three images is assembled to construct a single composite DDF file that is either saved on the user's local disk, printed, mailed to another user, or posted on the World Wide Web. Use of a composite DDF file in the place of the original three documents enables the user to move the composite DDF file around as a single file which is much smaller than the combination of the original three documents. The selected image data will only be retrieved from the image database when necessary, e.g., by a printer when the user requests to print the data, or by an email recipient reading the mail message. Furthermore, the user query could return a set of DDFs instead of the actual images, with the image data being retrieved from the image database at a subsequent time if the user so chooses.

The single composite DDF file described above may be implemented by using an AGGREGATION element. An example of such a DDF is shown in Table 11. An AGGREGATION element works like a virtual paper clip for putting together a sheaf of DDFs. In other words, the AGGREGATION element is the DDF conjunction operator. The component DDFs making up the aggregation may be embedded either by value or by reference. The meaning of the AGGREGATION element is that when the DDF client 25 processes the aggregation, all of the aggregation's components will be processed.

TABLE 17

```
<DDF>
    <Date VALUE="Mon Aug 4 09:48:55 PDT 1997"/>
    <Title VALUE="Photo Album"/>
    <Content-Type VALUE="Application/ddf-aggregation"/>
    <Aggregation>
        <DDF REF="photo-1.ddf"/>
        <DDF REF="photo-2.ddf"/>
        <DDF REF="photo-3.ddf"/>
    </Aggregation>
</DDF>
```

Similarly, the ALTERNATION element can be used within a composite DDF to provide the functionality of a logical disjunction. The ALTERNATION element is used to allow the DDF client 25 to pick one out of a collection of DDFs. The ALTERNATION element itself does not specify which element to pick; the DDF client 25 might choose one of the alternatives in an alternation based on constraints provided by the environment. For example, consider an image that is to be delivered to the DDF client 25. The image may have several representations, e.g., a low-resolution representation for quick screen previews, a medium-resolution representation for printing on an inkjet printer, and a high-resolution representation for sending to a high-end imagesetter. A DDF ALTERNATION element may be used to encapsulate each of the representations within a single DDF element. When the DDF file containing the alternation is delivered to the DDF client 25, the DDF client 25 chooses which one of the DDF's encapsulated within the alternation to retrieve, based on the current user environment.

The component DDFs of an alternation may be embedded either by value or by 25 reference. The meaning of the ALTERNATION element is that when the DDF client processes the alternation, one and only one of the alternation's components will be consumed. A DDF file containing an ALTERNATION element is shown in Table 12. Ellipses indicate portions of the DDF omitted for clarity.

TABLE 18

```
<DDF>
    ...
    <Alternation>
        <!-- Alternative 1: embed by value -->
            <DDF>
                <!-- text of DDF file goes here -->
            </DDF>
        <!-- Alternative 2: embed by reference -->
            <DDF ref="http://ddf.company.com/document.ddf"/>
    </Alternation>
</DDF>
```

Another useful operation that can be performed using DDFs is document subsetting. Consider the DDF shown in Table 13. The Application-data element of the DDF contains Start-Page, End-Page, and Number-of-Pages elements, containing information about the starting page, ending page, and number of pages of the referenced document, respectively. A user who wishes to print pages 10 through 20 of the referenced document could use the DDF client 25 to produce a secondary DDF file which encapsulates the original DDF file within the Source-DDF element, having a Start-page of 10 and an End-Page of 20. An example of such a secondary DDF is shown in Table 14. This secondary DDF could be passed to an appropriate application-specific DDF-aware server to obtain a Portable Document Format (PDF) document that has the document data for pages 10 through 20. Similarly, such a secondary DDF could be passed to a DDF-aware printer 42 that downloads only the minimal amount of document data needed to render the desired pages. In other words, DDF-aware applications can use such a secondary DDF file as a substitute for the referenced document until the document data is actually needed.

TABLE 19

```
<DDF>
    <Date VALUE="Fri, 27 Jun 1997 20:06:12 GMT"/>
    <URL VALUE="http://www.company.com/thesis.pdf"/>
    <NAME VALUE="PhD Thesis"/>
    <Content-Type VALUE="Application/PDF"/>
    <Content-Length VALUE="1105232"/>
    <Last-Modified VALUE="Fri, 05 Aug 1994 01:17:21 GMT"/>
    <Creating-Application> VALUE="Adobe Framemaker"/>
    <Application-Data>
        <Application-Version VALUE="5.5"/>
        <Source-Data>
            <!-- Application-specific data goes here -->
        </Source-Data>
        <Number-Of-Pages VALUE="143"/>
        <Start-Page VALUE="1"/>
        <End-Page VALUE="143"/>
        <Number-Of-Chapters VALUE="6"/>
    </Application-Data>
</DDF>
```

TABLE 20

```
<DDF>
    <Date VALUE="Fri, 27 Jun 1997 20:06:12 GMT"/>
    <URL VALUE="http://www.company.com/thesis.pdf"/>
    <TITLE VALUE="PhD Thesis"/>
    <Content-Type VALUE="Application/PDF"/>
    <Content-Length VALUE="1105232"/>
    <Last-Modified VALUE="Fri, 05 Aug 1994 01:17:21 GMT"/>
    <Creating-Application VALUE="Adobe Framemaker"/>
    <Application-Data>
        <Application-Version VALUE="5.5"/>
        <Source-Data>
            <!-- Application-specific data goes here -->
        </Source-Data>
        <Number-Of-Pages VALUE="143"/>
        <Start-Page VALUE="10"/>
        <End-Page VALUE="20"/>
        <Number-Of-Chapters VALUE="6"/>
    </Application-Data>
    <Source-DDF>
        <!-- DDF of Table 13 embedded by value here -->
    </Source-DDF>
</DDF>
```

Apparatus Implementation:

Referring to FIG. 7, the document description format plug-in 24 is implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output.

Suitable processors 1080 include, by way of example, both general and special purpose microprocessors. Generally, a processor will receive instructions and data from a read-only memory (ROM) 1120 and/or a random access memory (RAM) 1110 through a CPU bus 300. A computer can generally also receive programs and data from a storage medium such as an internal disk 1030 operating through a mass storage interface 1040 or a removable disk 1010 operating through an I/0 interface 1020. The flow of data over an I/O bus 1050 to and from I/O devices 1010, 1030, 1060, 1070 and the processor 1080 and memory 1110, 1120 is controlled by an I/O controller. User input is obtained through a keyboard 1070, mouse, stylus, microphone, trackball, touch-sensitive screen, or other input device. These elements will be found in a conventional desktop or workstation computer as well as other computers suitable for executing computer programs implementing the methods described here, which may be used in conjunction with any digital print engine 1075 or marking engine, display monitor 1060, or other raster output device capable of producing color or gray scale pixels on paper, film, display screen, or other output medium.

Storage devices suitable for tangibly embodying computer program instructions include all forms of non-volatile memory, including by way of example semiconductor memory devices, such as EPROM, EEPROM, and flash memory devices; magnetic disks such as internal hard disks 1030 and removable disks 1010; magneto-optical disks; and CD-ROM disks. Any of the foregoing may be supplemented by, or incorporated in, specially-designed ASICs (application-specific integrated circuits).

Although elements of the invention are described in terms of a software implementation, the invention may be implemented in software or hardware or firmware, or a combination of the three.

The present invention has been described in terms of an embodiment. The invention, however, is not limited to the embodiment depicted and described. Rather, the scope of the invention is defined by the claims.

What is claimed is:

1. A method, comprising:
    generating a first document description file for describing a document stored on a computer-readable medium, comprising:
        generating a description of an application, the application being a content authoring application program, that produced the document, and including the generated description of the application in the first document description file;
        generating a description of a location from which the document can be obtained, and including the generated description of the location in the first document description file; and
        generating a description specifying a computer-program-implemented operation that can be performed on the document, and including the generated description specifying the computer-program-implemented operation in the first document description file.

2. The method of claim 1, wherein the description of the location comprises a uniform resource locator.

3. The method of claim 2, wherein the uniform resource locator identifies a server configured to produce the document upon request.

4. The method of claim 2, wherein the uniform resource locator identifies a location at which the document is stored.

5. The method of claim 1, wherein:
    the operation comprises a transformation of the document from a file stored in a first storage format to a file stored in a second storage format; and
    the operation produces a second document description file that describes the file stored in the second storage format.

6. The method of claim 5, wherein the second document description file describes the first document description file.

7. The method of claim 1, wherein:
    the operation comprises extraction of information from the document; and
    the operation produces a second document description file that describes the information extracted from the document.

8. The method of claim 7, further wherein the second document description file describes the first document description file.

9. The method of claim 7, wherein the information extracted from the document describes a range of pages of the document.

10. The method of claim 7, wherein the document represents a multi-layered graphical object, and the information extracted from the document describes a subset of the layers of the multi-layered graphical object.

11. The method of claim 1, further comprising generating application-specific data describing the document.

12. The method of claim 11, wherein application-specific data comprises a name of an application that produced the document.

13. The method of claim 11, wherein application-specific data comprises a version number of an application that produced the document.

14. The method of claim 1, further comprising:
    generating a field containing information describing the document.

15. The method of claim 14, wherein the field is an HTTP header.

16. The method of claim 14, wherein the field describes a date on which the document was produced.

17. The method of claim 14, wherein the field describes a date on which the document was modified.

18. The method of claim 14, wherein the field describes a size of the document.

19. The method of claim 14, wherein the field describes content contained in the document.

20. The method of claim 1, wherein the content of the first document description file is represented in XML syntax.

21. A method comprising:
    receiving from a client (i) a request for information derived from a first document and (ii) a first document description file, the first document being stored on a first computer-readable medium, the first document being described by the first document description file, the first document description file comprising:
        a description of an application, the application being a content authoring application program, that produced the first document;
        a description of a location from which the first document can be obtained;
        a description specifying a computer-program-implemented operation that can be performed on the first document;
    retrieving the information derived from the first document; and
    generating a second document description file describing the information derived from the first document, the second document description file comprising:
        a description of an application for the derived information, the application being a content authoring application program;
        a description of a location from which the derived information can be obtained;
        a description specifying a computer-program-implemented operation that can be performed on the derived information.

22. The method of claim 21, wherein retrieving the information derived from the first document comprises retrieving a second document, stored on a computer readable medium, containing the information derived from the first document.

23. The method of claim 21, wherein retrieving the information derived from the first document comprises performing the operation on the first document to produce the information derived from the first document.

24. The method of claim 21, wherein the information derived from the first document comprises a second document.

25. The method of claim 24, wherein the second document description file comprises a pointer to the second document.

26. The method of claim 25, wherein the pointer comprises a uniform resource locator.

27. The method of claim 24, further comprising transmitting the second document to the client.

28. The method of claim 21, wherein the information derived from the first document comprises the first document.

29. The method of claim 21, wherein the information derived from the first document comprises a pointer to the first document.

30. The method of claim 29, wherein the pointer comprises a uniform resource locator.

31. The method of claim 21, further comprising:
transmitting the second document description file to the client.

32. The method of claim 21, wherein the first document description file contains the request.

33. A document description file, stored on a computer-readable medium, for describing a document stored on a computer-readable medium, the document description file comprising:
a description of an application program that produced the document, the application being a content authoring application program;
a description of a location from which the document can be obtained; and
a description specifying a computer-program-implemented operation that can be performed on the document.

34. The document description file of claim 33, wherein:
the operation that can be performed on the document comprises a transformation of the document from a file stored in a first storage format to a file stored in a second storage format; and
the operation produces a second document description file that describes the file stored in the second storage format.

35. The document description file of claim 33, wherein:
the operation that can be performed on the document comprises extraction of information from the document; and
the operation produces a second document description file that describes the information extracted from the document.

36. The document description file of claim 33, further comprising a description of an operation to be performed on the document.

37. A method executed on a computer for retrieving information derived from a first document, the first document being stored on a computer-readable medium, the method comprising:
retrieving by a first client a first document description file, stored on a computer-readable medium, in response to a request from a second client, the first document description file describing (i) an application, the application being a content authoring application program, that produced the first document, (ii) a location from which the first document can be obtained, and (iii) a computer-program-implemented operation that can be performed on the first document;
using the first document description file to retrieve the information derived from the first document; and
transmitting the information derived from the first document to the second client.

38. The method of claim 37, wherein using the first document description file to retrieve the information derived from the first document comprises retrieving a second document, stored on a computer readable medium, containing the information derived from the first document.

39. The method of claim 37, wherein using the first document description file to retrieve the information derived from the first document comprises performing the operation on the first document to produce the information derived from the first document.

40. The method of claim 37, wherein the information derived from the first document comprises a second document.

41. The method of claim 37, wherein the information derived from the first document comprises the first document.

42. A system comprising:
a first computer-readable medium having a first document produced by a first application;
a second computer-readable medium having a first document description file describing (i) the first application, the first application being a content authoring application program, (ii) a location on the first computer-readable medium from which the first document can be obtained, and (iii) a description of a computer-program-implemented operation that can be performed on the first document; and
a server configured to produce information derived from the first document.

43. The system of claim 42, wherein the information derived from the first document comprises a second document.

44. The system of claim 43, wherein the information derived from the first document comprises a second document description file describing the second document.

45. The system of claim 44, wherein the second document description file further describes the first document description file.

46. The system of claim 42, wherein the first and second computer-readable media are the same computer-readable media.

47. The system of claim 42, wherein the first and second computer-readable media are different computer-readable media.

48. A method executed on a computer, comprising:
generating a composite document description file for describing a combination of a first document description file and a second document description file, the method comprising:
generating a description of the combination;
generating a description of the first document description file that includes (i) a description of an application, the application being a content authoring application, that produced a first document, (ii) a description of a location from which the first document can be obtained, and (iii) a description specifying a computer-program-implemented operation that can be performed on the first document; and
generating a description of the second document description file that includes (i) a description of an application, the application being a content authoring application, that produced a second document, (ii) a description of a location from which the second document can be obtained, and (iii) a description specifying a computer-program-implemented operation that can be performed on the second document.

49. The method of claim 48, wherein the combination is an aggregation of the first document description file and the second document description file.

50. The method of claim 48, wherein the combination is an alternation of the first document description file and the second document description file.

51. The method of claim 48, further comprising:
generating a description of an operation that can be performed on the first document description file and the second document description file.

52. A composite document description file, stored on a computer-readable medium, the composite document description file comprising:

a description of a combination of a first document description file and a second document description file;

a description of the first document description file, the description including (i) a description of an application, the application being a content authoring application, that produced a first document, (ii) a description of a location from which the first document can be obtained, and (iii) a description specifying a computer-program-implemented operation that can be performed on the first document; and a description of the second document description file, the description including (i) a description of an application, the application being a content authoring application, that produced a second document, (ii) a description of a location from which the second document can be obtained, and (iii) a description specifying a computer-program-implemented operation that can be performed on the second document.

53. The document description file of claim 52, wherein the combination is an aggregation of the first document description file and the second document description file.

54. The document description file of claim 52, wherein the combination is an alternation of the first document description file and the second document description file.

55. The document description file of claim 52, further comprising a description of an operation that can be performed on the first document description file and the second document description file.

56. A computer program product, tangibly stored on machine-readable medium, the product comprising instructions operable to cause a processor to:

generate a first document description file for describing a document stored on a computer-readable medium, wherein instructions to generate the first document description file includes instructions to:

generate a description of an application, the application being a content authoring application program, that produced the document, and include the generated description of the application in the first document description file;

generate a description of a location from which the document can be obtained, and include the generated description of the location in the first document description file; and generate a description specifying a computer-program-implemented operation that can be performed on the document, and include the generated description specifying the computer-program-implemented operation in the first document description file.

57. The product of claim 56, wherein the description of the location comprises a uniform resource locator.

58. The product of claim 56, wherein:

the operation comprises a transformation of the document from a file stored in a first storage format to a file stored in a second storage format; and the operation produces a second document description file that describes the file stored in the second storage format.

59. The product of claim 56, wherein:

the operation comprises extraction of information from the document; and the operation produces a second document description file that describes the information extracted from the document.

60. The product of claim 59, wherein the second document description file describes the first document description file.

61. The product of claim 56, further comprising instructions to:

generate application-specific data describing the document.

62. The product of claim 60, wherein application-specific data comprises one of a name of an application that produced the document or a version number of an application that produced the document.

* * * * *